United States Patent Office 3,323,922
Patented June 6, 1967

3,323,922
PROTECTIVE COATINGS
Jack R. Durst, Osseo, Minn., assignor to The Pillsbury Company, Minneapolis, Minn., a corporation of Delaware
No Drawing. Filed Aug. 9, 1965, Ser. No. 478,407
20 Claims. (Cl. 99—166)

This application is a continuation-in-part of a prior application bearing the same title having Ser. No. 262,327, filed Mar. 4, 1963, now abandoned.

This invention relates generally to the art of protective coatings and more particularly to the coating of edible food products.

Oils both of the edible and inedible variety have long been used as protective coatings for both edible and inedible products. For example, lubricating oils are commonly used to protect metals from the deteriorative effects of air and moisture. Edible animal and vegetable fats have also been used to protect food products. The use of oils in this manner is attended by many disadvantages.

Both edible and inedible articles have also been coated with film forming substances, such as polyvinyl chloride, and water hydratable substances, such as sodium caseinate, CMC, etc. These coatings have also been disadvantageous in many respects, several of which are permeability to oxygen, lack of flexibility, toughness, and brittleness.

Two of the main requisites for protective coatings are the ability of a coating to protect the base substance from corrosive and deteriorative gases, such as oxygen, and to withstand the effects of high or low humidity conditions. In the field of edible coatings, hydroscopicity has long been a problem and under conditions of high temperature and humidity, many coatings heretofore available have rapidly deteriorated. Moreover, many edible coatings such as chocolate coverings for candies break down when merely subjected to temperatures only slightly above room or body temperature.

Therefore, it is the general object of the present invention to provide novel protective coatings for both edible and inedible substances.

A further object is to provide edible, non-hydroscopic coatings for edible substances.

A further object of the invention is to provide novel edible coatings which have the ability to withstand temperatures substantially in excess of body temperature for significant periods of time.

Other objects of the invention become apparent in the following detailed description.

In accordance with the present invention, the above objects are attained by forming a coating from the following components:
(1) A film forming substance;
(2) A plasticizer which enables the film former to form a film; and
(3) A material which is liquid at the temperatures at which the coating is formed and which is immiscible in the plasticizer, hereinafter referred to as the "immiscible liquid."

These three components in proper proportions are subjected to mixing for a time sufficient to produce a stable dispersion of the immisicible liquid (i.e., component 3 above) as the internal phase in an external phase formed by the plasticized film former, which dispersion is then applied in any convenient manner to the article to be coated. Preferably, when the film former is in the dry rather than pre-hydrated state components 1 and 3 are premixed before addition of the plasticizer. The article thus coated is then treated to remove excess plasticizer and to rigidify or set the coating.

Examples of suitable film forming substances include egg albumin, human serum albumin, sodium proteinate of soybean, wheat germ, gelatin, sodium caseinate, nonfat milk solids, whole egg, pea flour, bean flour, corn germ, gelatinized starch, carboxymethylcellulose, agar agar, fish protein, gelsoy (soybean protein), whey, dextran, bran protein, polyvinyl alcohol, polyvinyl chloride, and polyvinylpyrrolidone.

Plasticizers for the above include water, glycerine propylene glycol, and ethylene glycol for the water-hydratable (hydrophilic) substances, such as egg albumin, sodium caseinate, gelatinized starch and polyvinylpyrrolidone, and ethyl acetate for such non-water soluble substances as polyvinyl chloride. It should be apparent that the foregoing lists are not exhaustive and that given a film forming substance, anyone skilled in the art can easily select a suitable plasticizer.

Examples of immiscible liquids (i.e., component 3 above) include cottonseed oil, corn oil, peanut oil, soy oil, linseed oil, safflower oil, motor oil, melted lard, melted margarine base, melted margarine, melted butter, melted butter oil, chloroform, ethyl phthalyl ethyl glycolate, butyl phthalyl butyl glycolate, melted waxes, benzene, and toluene. The term "oil" as used herein includes substances which are solid at room temperature but liquid at the temperature at which the dispersion is formed.

It should be apparent that combinations of each of the above components can be used. For example, sodium caseinate and egg albumin may be advantageously used together. Similarly, combinations of oils and/or plasticizers may also be used. For this reason, the terms "film former," "plasticizer" and "immiscible liquid" or "oil" when used herein are intended to cover all compatible combinations, even if used in the singular.

Any ratio of amount of film former to immiscible liquid which will allow formation of a stable dispersion with a plasticizer is suitable. Any amount of immiscible liquid will contribute to increased pliability and decreased permeability of a coating. As the ratio is increased, however, a point is reached where a dispersion cannot be formed because of the lack of an adequate amount of film former. This point will vary from one film former to the next. For example, with the sodium caseinate-vegetable oil system, an oil to sodium caseinate ratio of approximately 60 to 1 appears to be the upper limit but in the polyvinyl alcohol-lubricating motor oil system, ratios as high as 80 to 1 are suitable. Thus, an upper limit on the ratio of immiscible liquid-to-film former exists with respect to each and every system. Although this limit cannot be set forth for every conceivable system, it can be easily determined in a given system by slowly increasing the ratio until a dispersion can no longer be formed.

In general, it is preferred that the immiscible liquid-to-film former ratio be maintained within the range of 0.15 to 15.

The amount of plasticizer to be used is also an amount which will allow the formation of a stable dispersion. While this amount can vary within wide limits, in general it is preferred that the amount of plasticizer be kept near the minimum amount while the dispersion is being formed. It has been observed that the stability of the dispersions which result is substantially greater if the amount of plasticizer is maintained at a minimum. A film former containing a minimum amount of plasticizer can be looked upon as being equivalent to a "saturated solution" of that film former in the plasticizer. In any given system this amount can be found by placing the film former and immiscible liquid at the desired ratio into a mixing vessel and slowing adding plasticizer thereto with mixing until a stable dispersion is formed.

In the above three-component system any number of additives can be incorporated. These include flavoring materials such as sugar, salt and cocoa; fillers such as nonhydrolyzed starch; coloring; vitamins and minerals; preservatives; and humectants.

The formed dispersion may be applied to the article to be coated in any convenient manner. Examples of suitable methods include spraying, dipping, pouring, brushing or rolling. To suit the particular method selected, it may be necessary to adjust the viscosity of the dispersion by temperature control or the addition or deletion of the plasticizer. For example, it is generally necessary to add plasticizer to the dispersion to reduce viscosity if spraying is to be used.

In the coating of edible food products, for example, any convenient edible film former, such as sodium caseinate, is mixed with any suitable edible oil, such as corn oil, in the presence of water or any other suitable plasticizer in such proportions as to form a stable dispersion in which the oil exists in the internal phase and the hydrated (plasticized) sodium caseinate in the external phase. This dispersion is then applied in any convenient manner to the foodstuff to be coated, such as for example by dipping, after which the excess water is removed by dehydration to rigidify or set the coating. The coating which results is a highly effective barrier against air, shows little hygroscopicity and withstands temperatures substantially in excess of body temperature without substantial deformation. The oil apparently contributes to the pliability of the coating and also decreases the permeability of the coating to air. The film former provides structure and strength for the coating and protects the oil from the deleterious effects of air. Moreover, for reasons not presently fully understood, coatings formed in accordance with the present invention are extremely tenaceous with respect to the base article to which the coating is applied. The coatings are readily soluble in the mouth.

After the article has been coated, excess plasticizer is removed from the coating by conventional drying techniques. These include air drying and vacuum drying with or without adding heating. Drying under refrigeration may also be used. The temperature should desirably be maintained below the boiling point of the plasticizer in order to avoid rupture of the external phase of the dispersion.

The purpose of the plasticizer-removal step is to set the coating and prevent run off thereof. After sufficient plasticizer has been removed to set the coating, further removal merely serves to further rigidify and harden the coating. If desired, drying can be continued until all of the plasticizer has been removed at which point the coating will be quite brittle.

As an alternative to the foregoing method of coating, the formed dispersion can be spray dried to a free flowing powder for storage or shipment. Subsequently, the dry powder may then be replasticized and applied as a coating in the manner outlined above.

Coatings made in accordance with the present invention may be advantageously applied to any solid material, whether edible or inedible. Examples of edible materials include raw, cooked and dehydrated meats, vegetables and fruits; dessert items; cheese and snack items such as candies and nuts. Obvious non-food articles include metal machinery, weapons and metal parts which have a tendency to oxidize when exposed to atmospheric conditions.

The coating which results is characterized, as noted above, by flexibility, strength, lack of hygroscopicity, and low permeability to gases and moisture. Moreover, the coating is quite stable to temperature (i.e., it will not deform appreciably at temperatures in the 100–200° F. range as do many edible coatings, and is quite stable to variations of humidity in the surrounding atmosphere. While coatings having these properties are highly advantageous in the food field, they are also advantageous in the non-food field. One very desirable property in that field is that the coatings release oil when ruptured. Thus, if a coating applied to a steel object is ruptured, the released oil will still serve to protect the metal. The set coatings employed in the instant invention are stable against elevated temperature (e.g., 300° F.) and will ultimately degrade by charring rather than by separation of the internal phase (i.e., the finely dispersed oil) from the external phase.

To illustrate the invention in greater detail, the following examples are offered:

EXAMPLE I 20 grams of sodium caseinate and 80 grams of vegetable oil (an oil-to-film former ratio of 4) were placed in a high speed blender and mixed at slow speed until the sodium caseinate had been thoroughly coated with oil. To this mixture 80 grams of water were added with high speed mixing until a dispersion formed after about one minute. Small pieces of fig bar were dipped in the dispersion, placed on metal sheets and allowed to dry overnight in air at room temperature. The coating which resulted was not sticky, quite pliable, stable to temperatures at least as high as 200° F., non-hygroscopic, and inhibited oxidative deterioration of the fig bar.

EXAMPLE II 100 grams of melted lard, 16 grams of dried egg albumin, 4 grams of gelatin (an oil-to-film former ratio of 5), and 80 grams of sucrose (as a filler and flavoring agent) were placed in a high speed blender and mixed at a slow speed at a temperature of 150° F. until the lard had coated all of the dry particles. 100 ml. of water at a temperature of 120° F. were added with high speed mixing until a dispersion formed after about one minute. Small pieces of brownies were coated with the dispersion by hand dipping and were dried in air at room temperature overnight. The coated pieces were then placed in an atmosphere of oxygen at a temperature of 80° F., a pressure of 0.5 atmosphere and at relative humidities of 22.9% and 53.9%, and held in each case for 4 days. At the end of the storage test, no appreciable change in the condition of the coating had occurred at either of the two humidities, and upon breaking of the coating, the brownies appeared to be in the same condition as when placed in storage both as to physical and organoleptic properties.

EXAMPLE III

A dispersion was formed as in Example II above but with the following formulation: melted lard, 90 grams; sodium caseinate, 18 grams; gelatin, 4 grams (oil-to-film former ratio of 4); 88 grams of sucrose as a flavoring agent and filler and 100 ml. of water. This dispersion was used to coat ¾ inch cubes of pound cake which were subjected to the same 4-day storage test described in Example II above. As in Example II both the coating and the pound cake survived the storage test without noticeable deterioration. An uncoated cube of pound cake dehydrated within one hour when exposed to room temperature air.

EXAMPLE IV

A dispersion was formed as in Examples II and III above but using the following formulation: 90 grams of melted lard; 16 grams sodium caseinate; 4 grams of gelatin (oil-to-film former ratio of 4.5); 10 grams corn starch and 80 grams sucrose as filler and flavoring agents; 0.2 gram citric acid as pH control; 0.2 gram of potassium sorbate and 0.2 gram propyl parasept as preservatives; and 75 ml. water. The resulting dispersion was used to coat ¾″ cubes of commercially available milk chocolate. The coating was applied by placing the chocolate cubes on wire racks and spraying the dispersion, which had been diluted with 20 parts of distilled water to 100 parts dispersion, on all sides except the bottom. After the sprayed coating had been dried overnight in air at room temperature, the bottoms of the cubes were coated by means of a brush. The brushed on coating was also allowed to dry overnight. The coating which resulted appeared satisfactory in all respects and withstood storage tests similar to those described in Examples II and III above.

EXAMPLE V

A dispersion is formed as in Example IV above, which dispersion is then diluted with water at a ratio of 20 parts by weight of water to 100 parts by weight of dispersion. The diluted dispersion is then spray-dried in air at an inlet temperature of approximately 230° F. and an outlet temperature of approximately 180° F. to form a free flowing dry powder. 200 grams of powder are added to 75 grams of water with mixing and the resultant dispersion is sprayed on donuts. The thus coated donuts are then dried in air at room temperature to set the coating, which coating is highly advantageous over conventional glazes because of its lack of hygroscopicity.

EXAMPLE VI 10 grams corn starch and 7.0 grams of sucrose as a filler and flavoring agents; 19.2 grams sodium caseinate; and 47.1 grams vegetable oil were placed in a high speed blender and mixed at low speed until the oil had coated all of the dry materials. 100 ml. of water containing 16.7 grams of lactose as additional filler were added to the dry ingredients with high speed mixing until a dispersion formed. The dispersion was applied as a coating to freeze dried meat and the coating dried in air at about 170° F. until set. The resultant coating was highly effective in protecting the meat from mechanical damage and from the deleterious effects of air.

EXAMPLE VII

A dispersion was formed using 200 grams of a low viscosity non-detergent motor oil; 20 grams of polyvinyl alcohol (an oil-to-film former ratio of 10); and 250 ml. of water. Corks were coated to test the efficacy of this dispersion as a coating and the resultant coating were judged satisfactory. In addition, pieces of silver were coated and subjected to the effects of hydrogen sulfide. No attack by hydrogen sulfide was observed.

EXAMPLE VIII

A. *Stable dispersion preparation*

| Ingredients | Amount (grams) | | | | |
| --- | --- | --- | --- | --- | --- |
| | A | B | C | D | E |
| "Durkex 500" [1] | 90 | 90 | 180 | 180 | 90 |
| Sodium caseinate | 36 | 36 | 36.0 | 36 | 36 |
| Gelatin | 18 | 0.0 | 18 | 0.0 | 0.0 |
| Sucrose | 140.7 | 173.7 | 65.7 | 83.7 | 173.7 |
| Anhydrous citric acid | 0.3 | 0.3 | 0.0 | 0.3 | 0.3 |
| Water | 195 | 180 | 189 | 174 | 174 |

[1] Stabilized soybean oil.

In Runs A and B, stable dispersions as employed in the invention were prepared by first heating the oil, in the amounts designated, until it became translucent (at about 150° F.). The oils were then placed into separate Waring Blendors and 36 grams of sodium caseinate along with specified amounts of sucrose, per Runs A and B, was added. The resultant products were respectively blended at a low speed to form a uniform slurry. In Run A, an aqueous portion was simultaneously prepared by adding to cold water (about 60° F.) 18 grams of gelatin. After allowing sufficient time for the gelatin to swell, the gelatin and water was then heated to 150° F. whereupon 0.3 gram of anhydrous citric acid was dissolved therein. In Run B, the 180 grams of water was merely heated to 150° F. and the 0.3 gram portion of citric acid was dissolved therein. The aqueous portions of Runs A and B were then rapidly poured into the appropriate Blendors containing the oil portion while maintaining vigorous agitation. The resultant aqueous and oil portions were then mixed in the Waring Blendors at a high speed for one minute. To insure a homogeneous mixture, the material sticking upon the inner walls of the Blendors was scraped into the mixed product and the Waring Blendors were operated for an additional two minutes at a high speed. The dispersions thus formed from Runs A and B consisted of fine oil droplets (i.e., the internal phase) dispersed throughout the plasticized hydrophilic film former (i.e., the external phase). Stability of the dispersions thus formed in Runs A and B were tested by mixing a drop of the dispersion in 100 ml. of hot water (130° F.). No separation of the oil portion from the dispersions was observed thus indicating that finite oil droplets were encapsulated within the water, plasticized hydrophilic film former portion.

Stable dispersions of Runs C, D and E were prepared, in general, by adding to three separate Waring Blendors the indicated amounts of hot water (150° F.) to which there was added 36.0 grams of sodium caseinate. The Blendors were then operated at a high speed for two minutes in order to provide uniform dispersions of water and sodium caseinate which had a substantial amount of air incorporated therein. By employing this aeration step, it has been found that a creaming effect in the ultimate product can be substantially eliminated.[2] The 65.7, 83.7 and 173.6 gram portions of sucrose were then respectively added to and blended into the respective uniform suspensions after which the oil was added in the recited amounts. The Blendors were then operated at a high speed for one minute, scraped and then run for an additional two minutes at a high speed. In Runs D and E, the 0.3 gram portions of anhydrous citric acid was dissolved in 6 grams of hot water (150° F.) and then added to the Blendors followed by an additional minute of high speed blending. Stability tests similar to that employed in Runs A and B indicated that the dispersions of Runs C–E were stable against oil separation. The aeration method, as used in Runs C–E is the most suitable method wherein a high oil concentration is employed. Similar to Runs A and B, the resultant products of Runs C–E consisted of finite droplets of oil dispersed in the plasticized film former portions.

B. *Stability of redispersed coatings*

About 50 percent of the material thus prepared in Runs A–E was dehydrated. Dehydration (i.e., forming a set dispersion) was accomplished by placing a ⅛ inch layer of the respective stable dispersions in separate drying pans and then drying for 18 hours at 150° F. Twenty gram portions of the coating from Runs A–E were then respectively redispersed in 20 grams of hot water (150° F.). It was noted that the coating redispersed in the water without forming a precipitate or concomitant separation of the oil phase from the hydrophilic film former. The redispersed set dispersions were then centrifuged for 15 minutes via an International Clinical Centrifuge operated at full speed.[3] Table I contains the observed results.

Run A _____ Creaming with no fat separation.
Run B _____ Creaming, however, no fat separation.
Run C _____ Very slight creaming with no fat separation.
Run D _____ Very slight creaming; no fat separation.
Run E _____ Very slight creaming with no fat separation.

Thus as evidenced from Table I, the fat portion (i.e., internal phase) is strongly protected against separation when subjected to strong centrifugal forces.

---

[2] Creaming is the formation of a layer of the stable dispersion consisting of the finite droplets of oil (i.e., internal phase) surrounded by the hydrophilic film former portion (i.e., external phase) when the coatings are redispersed in water and subjected to a centrifugal force. The term creaming does not refer to separation of the oil from the dispersion. The degree of creaming is related to extent the redispersed protective coating will tend to form a cream-like layer when subjected to a centrifugal force.
[3] 3,000 r.p.m.

C. Stability of the coating against decomposition

Employing a standard test for stability of oils,[4] glass rods were respectively coated with about 1/20 inch layer of the stable dispersions from Runs A–E and then dried under ambient conditions. The coated rods were then broken into two-inch lengths and placed in test tubes provided with means of venting an air current thereover. The coated rods were maintained at 97.8° C. while subjecting to a heated air current. No rancid odor was observed after eight days thus indicating that the oils (i.e., internal phase) was protected from decomposition via the hydrophilic film former portion.

It should be apparent that the foregoing examples were given for illustrative purposes only and were not intended and should not be construed as limiting the invention. The invention should, rather, be limited only by the claims appended hereto.

What is claimed as new and novel is:

1. An edible coated article of manufacture comprising:
   (a) An edible base article; and
   (b) An edible, solid, water-dispersible coating consisting essentially of a set dispersion having an external phase of an edible hydrophilic film former and water and an internal phase of an edible fat, said coating being stable against deformation at a temperature of 100° F.

2. The article of manufacture of claim 1 further characterized in that the ratio of fat to film former in said coating is within the range of 0.15:1 and 15:1.

3. The article of manufacture of claim 2 further characterized in that said film former comprises sodium caseinate.

4. The article of manufacture of claim 2 further characterized in that said film former consists of sodium caseinate and egg albumin.

5. The article of manufacture of claim 2 further characterized in that said film former comprises nonfat milk solids.

6. The article of manufacture of claim 2 further characterized in that said fat is normally solid at room temperature.

7. The article of manufacture of claim 2 further characterized in that said external phase contains a carbohydrate as a filler.

8. A method of coating an edible article which comprises the steps of:
   (a) admixing an edible fat and edible hydrophilic film former with a sufficient amount of water at a temperature sufficient to melt said fat and for a period of time sufficient to provide a stable dispersion consisting essentially of an external phase of the hydrophilic film former and water and an internal phase of an edible oil;
   (b) Applying said stable dispersion to an edible base article to provide a coating therefor; and
   (c) Removing a sufficient amount of water to set the dispersion and provide an edible, solid water-dispersible coating stable against deformation at a temperature of 100° F.

9. The method of claim 8 further characterized in that the ratio of fat to hydrophilic film former is within the range of 0.1:1 and 15:1.

10. The method of claim 9 further characterized in that said film former comprises sodium caseinate.

11. The method of claim 9 further characterized in that said film former comprises sodium caseinate and egg albumin.

12. The method of claim 9 further characterized in that said film former comprises nonfat milk solids.

13. A method of coating an edible article which comprises the steps of:
    (a) Forming an edible stable dispersion comprising a hydrophilic film former, water and oil, the ratio of oil to hydrophilic film former being within the range of 0.1:1 and 15:1 and the amount of water being not substantially in excess of the minimum amount required to form said dispersion;
    (b) Applying said dispersion as a coating to said article; and
    (c) Removing a sufficient amount of water to set said dispersion and provide an edible, solid water-dispersible coating stable against deformation at a temperature of 100° F.

14. The method of claim 13 further characterized in that said hydrophilic film former comprises sodium caseinate.

15. The method of claim 14 further characterized in that said dispersion is applied as a coating by spraying.

16. A method of coating an edible article which comprises the steps of:
    (a) admixing an edible fat and an edible hydrophilic film former with a sufficient amount of water at a temperature sufficient to melt said fat and for a period of time sufficient to provide a stable dispersion consisting essentially of an external phase of the hydrophilic film former and water and an internal phase of edible oil;
    (b) Dehydrating said dispersion to form a redispersible solid;
    (c) Redispersing said dehydrated dispersion to form a second dispersion;
    (d) Applying said second dispersion as a coating to said article; and
    (e) Removing a sufficient amount of water to set said dispersion and provide an edible, solid water-dispersible coating stable against deformation at a temperature of 100° F.

17. The method of claim 16 further characterized in that said hydrophilic film former comprises sodium caseinate.

18. A method of coating an edible article of manufacture which comprises:
    (a) Providing a dehydrated, edible dispersible solid consisting essentially of an external phase of an edible hydrophilic film former and water and an internal phase of oil;
    (b) Dispersing said dehydrated dispersion in water;
    (c) Applying said water dispersion to an edible base article to provide a coating therefor; and
    (d) Removing sufficient amount of water to set said dispersion and provide an edible, solid water-dispersible coating stable against deformation at a temperature of 100° F.

19. The method of claim 18 further characterized in that said hydrophilic film former comprises sodium caseinate.

20. The article of manufacture of claim 1 further characterized in that said fat is selected from the group consisting of cottonseed oil, corn oil, peanut oil, soy oil, safflower oil, lard, margarine base, a solid butter fat and butter oil.

References Cited

UNITED STATES PATENTS

| | | | |
|---|---|---|---|
| 1,449,976 | 3/1923 | Dunham. | |
| 1,764,839 | 6/1930 | Hoskins. | |
| 2,005,184 | 6/1935 | Forrest | 99—168 X |
| 2,191,352 | 2/1940 | Oprean | 99—166 X |
| 2,754,215 | 7/1956 | Evans et al. | 99—166 X |

FOREIGN PATENTS 22,114    9/1905    Great Britain.

A. LOUIS MONACELL, *Primary Examiner.*

M. W. GREENSTEIN, *Assistant Examiner.*

---
[3] AOCS–CD–12–57.